United States Patent Office 3,850,894
Patented Nov. 26, 1974

3,850,894
PROCEDURE FOR THE PRODUCTION OF POLY-
MERS AND COPOLYMERS OF ISOBUTYLENE
AND POLYMERS OBTAINED
Aldo Priola, Sebastiano Cesca, and Giuseppe Ferraris, San Donato Milanese, and Mario Bassaredda Boy and Paolo Giusti, Pisa, Italy, assignors to Snam Progetti S.p.A., San Donato Milanese, Italy.
No Drawing. Filed Nov. 15, 1972, Ser. No. 306,900
Claims priority, application Italy, Nov. 26, 1971, 31,723/71
Int. Cl. C08d 1/26, 3/04, 3/10
U.S. Cl. 260—85.3 R     6 Claims

ABSTRACT OF THE DISCLOSURE

A process is disclosed whereby butyl rubber of high molecular weight and excellent physical characteristics is readily prepared by copolymerizing isobutylene and isoprene in the presence of a catalyst system consisting of:

(a) a metalorganic compound of aluminum represented by the formula $AlR_3$ or $AlR_2X$, wherein X is an atom of halogen and R is a hydrocarbon radical having from 1 to 10 carbon atoms; and
(b) a haloid of an organic acid or thioacid represented by the general formula:

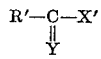

in which X' is a halogen atom; R' is a saturated or unsaturated alkyl residue, cycloalkylic, alkylarylic, alkylcycloalkylic, or is equal to X', or is

and Y is oxygen or sulphur.

---

This invention relates to a process for the production of polymers and copolymers of isobutylene using a particular catalyst system which enables us to utilize higher reaction temperatures than those previously used industrially; it also enables us to obtain higher yields in polymers having a higher molecular weight and generally better properties, depending upon the operating conditions selected and other factors known to those skilled in the art. More particularly, this invention refers to an invention for the production of butyl rubber.

It is well known that butyl rubber is industrially produced by means of a process of copolymerization wherein cationic type initiators are used.

In particular, the copolymerization is achieved through the use of $AlCl_3$ in ethyl chloride or methyl chloride solution at $-100°$ C. The use of a solid catalyst insoluble in common hydrocarbon solvents and only slightly soluble in chloride solvents, has created many difficulties in the efficacious control of this reaction.

We remember that the preparation of the catalyst solution itself is somewhat complex, and that in general, it is effected by means of the passage of a current of ethyl chloride or methyl chloride on a bed of a solid aluminum trichloride.

Also the subsequent determination of the concentration of the catalyst that is obtained through titration of the $AlCl_3$ still gives results which are very complex and it often gives very unexpected results. It is evident from what is noted above that recently there has been much effort on the part of various researchers and industries interested in the production of this type of rubber, towards the discovery of new catalyst systems that would simultaneously solve the problems of the dosage for the catalyst and the raising of the temperature of polymerization without of course, compromising the properties of the rubber and, in particular, without lowering the value of the molecular weight.

Recently, some researchers perfected a new soluble catalyst system that enables us to obtain butyl rubber with a high molecular weight at considerably higher temperatures than those normally used in industrial processes.

The system in question is based upon a combination of an haloid of Friedel-Crafts "modified" for examples $AlEt_2Cl$, with an appropriate co-catalyst. These haloids are not usually capable of initiating the polymerization of isobutylene by themselves, or of mixtures of isobutylene-monomers-diene or other monomers that normally polymerize with a cationic type mechanism. The polymerization or co-polymerization begins only when the co-catalyst is introduced. This co-catalyst may be composed of a substance able to produce protons such as, for example, HCl and other Brönsted acids, or by a substance capable of supplying carbon ions, such as, for example, chloride or t-butyl. The assignee of this application also owns a patent application pertaining to a procedure for the production of butyl rubber by means of the use of a catalyst system constituted by a reducing aluminum compound and by a co-catalyst capable of giving cations for interaction with the catalyst. The co-catalyst may be a halogen introduced as such, or other interhalogenic compounds.

The process which has now been perfected by us, and which constitutes the subject of this application, presents all the advantages of the catalyst systems mentioned previously and which are essentially connected with considerable ease of control of the polymerization reaction owing to the solubility of these catalysts in common organic solvents, so that whenever necessary, it is possible to operate with minimum quantities of solvents even in its total absence, in which case, the same non-reacted monomer functions as a diluent.

In comparison with the processes using haloids of dialkyl-aluminum and strong acids, it also presents the advantages of obtaining products of higher molecular weight at even higher reaction temperatures. It also presents major regularity in the polymerization process, permitting in fact, a major control of the temperature, and therefore a higher regularity in the polymers produced.

Then, in respect to the systems using halogen solutions and interhalogenic compounds, it has the great advantage of being easier to handle with regard to the compounds used as catalysts. Besides, it has the still greater advantage of greater ease in dosing the co-catalyst, eventually also during the polymerization, as compared to the Brönsted acids, and it is more economical with regard to the co-catalyst composed of alkylic haloids, especially taking into account the high quality of purity that they must possess. Although this application is concerned essentially with the production of butyl rubber, in view of the industrial interest in this substance, it will be easy for the expert in the art using the catalyst system described herein, to find the ideal conditions for the copolymerization of different monomers.

In particular, the usable mono-olefine may include from 4 to 7 carbon atoms ($C_4$-$C_7$), while the multi-olefine is generally constituted by diolefine conjugated with from 4 to 14 carbon atoms ($C_4$-$C_{14}$), such as isoprene, butadiene, 2,3 dimethyl, 1,3 butadiene, while examples of the first may be isobutene; 2-methyl butene-1,3 - methylbutene - 1,2 - methyl-butene - 2,4-methyl - pentene-1. As noted above, only great industrial interest has prompted us to limit our examples to the case of butyl rubber, that is, to the copolymerization of isobutylene and isoprene in quantities ranging from 90 to 99.5 of isobutylene by weight and from 10 to 0.5% of isoprene by weight.

The reaction media used are those which are normally used in the art to which this invention relates, and that is, ethyl chloride, methyl chloride, or methylene chloride. Hydrocarbon compositions may also be used as long as they are liquid at the temperature of reaction, such as, for example: pentane, isopentane, n-heptane, cyclohexane, or even solvents maintained in the liquid phase at the temperature of reaction, such as the monomer or the monomers used.

The molecular weights of the products obtained vary over a wide range according to the conditions adopted.

The catalyst system of the invention includes:

(a) a metalorganic compound of aluminum of the formula $AlR_3$ or $AlR_2X$ where X is an atom of halogen and R is a hydrocarbon radical having from 1 to 10 carbon atoms, or hydrogen;

(b) a haloid of an organic acid or thioacid represented by the general formula:

$$R'-\underset{\underset{Y}{\parallel}}{C}-X'$$

in which X' is a halogen atom, R' is a saturated or unsaturated alkylic residue, cycloalkylic, alkylarylic, alkylcycloalkylic, or it can be equal to X' or $$-\underset{\underset{Y}{\parallel}}{C}-X'$$

and Y is oxygen or sulphur. All the residues indicated by R' can be simple or variably substituted by typical organic functional groups such as $-NO_2$, $-C_nH_{n+1}$, $-OC_nH_{n+1}$, $-N(C_nH_{n+1})_2$, or halogens etc.

Typical examples of these co-catalysts are: $CH_3COCl$, $(CH_3)_3CCOCl$, $CH_2=CHCOCl$, $(NO_2)_3C_6H_2COCl$, $C_6H_5COCl$, $COCl_2$, $CSCl_2$, $CCl_3COCl$, $C_6H_5CH=CHCOCl$, $CH_2=CClCOCl$, $COClCOCl$, $BrCH_2COCl$, $CH_3OC_6H_4CH_2COBr$, $C_6H_{11}COCl$, $CH_2=C(CH_3)-COCl$, $CH_2=CH-CH_2COCl$, $CClF_2COCl$, $Cl_3SCl$, $CCl_2=CClCOCl$, $CCl_3COBr$, $Cl_2C_4H_3COCl$, $COBrCOBr$, $C_6H_5CH_2COCl$, etc.

The catalyst may be preformed, and preferably the co-catalyst is slowly added to the reaction environment in portions. The molar ratio between the total quantity of compound (b) and compound (a) is less than 1 and it is preferably between 0.5 and $10^{-4}$. In the practice of our invention, the polymerization reaction is conducted in the range from $-100$ to $+30°$ C.

The molecular weights of the polymers prepared in the following examples were obtained through viscosimetric measures of polymer solutions in cyclohexane at 30° C.

After having determined the intrinsic viscosity by the extrapolation at C=O of the curves $\ln\eta_{a/c}$ and $\ln\eta_{sp/c}$, the average molecular weight of the single polymer was calculated by the following equation:

$$\ln M_v = 11.98 + 1.452 \ln[\eta]$$

The invention will be more clearly understood by consideration of the following illustrative examples.

Example 1

We used a completely glass tubular reactor having a capacity of 300 cm.³, provided with a mechanical agitator and a thermometric sheath, previously dried by heating under a dry Argon flow and maintained during the execution of the experiment under a slight positive pressure of Argon (20–30 torr in respect to the atmospheric pressure) 80 cm.³ of $CH_3Cl$ are condensed, and then 28.4 g. of isobutylene, 0.84 g. of isoprene and 2 m. moles (cc. 0.254) of $AlEt_2Cl$ are introduced and the temperature is brought to $-40°$ C. by means of a thermostatically controlled bath.

To the reaction mixture are subsequently added while heavily shaking, 0.2 m.moles of $CH_3COCl$ dissolved in 5 cc. of $CH_3Cl$, regulating the addition over a period of 5 minutes for which we obtained a temperature increase of 3° C. We continued the shaking for ten minutes after the end of the addition and when stopped the reaction by adding methanol to the suspension of the polymer that we produced. We obtained 7.7 g. of dry polymer (yield=27.1%) which supplied a value of $[\eta]=1.72$ dl./g. determined in cyclohexane, which corresponds to an average viscosimetric molecular weight equal to 340,000 and an unsaturation content determined iodometrically, corresponding to 2.7% in isoprene weight.

The polymer obtained was made to undergo vulcanization in slit plates using a mixture of the following composition, prepared on the open cylinder mixer:

|  | Parts |
|---|---|
| Polymer | 100 |
| EPC black | 50 |
| Antioxidant 2246 | 1 |
| ZnO | 5 |
| Stearic Acid | 3 |
| Sulphur | 2 |
| MB TDS (mercapto-benzothiazole-disulphur) | 0.5 |
| TMTD (tetramethyl-thiurame-disulphur) | 1 |

The mixture is vulcanized at 153° C. for 40 and 60 minutes. The properties of the vulcanized products are include in Table 1; Table 2 shows as a means of comparison, the properties of a typical sample of commercial butyl rubber determined under the same conditions.

TABLE 1

| | | |
|---|---|---|
| Vulcanization time (minutes) | 40 | 60 |
| Modulus at 100% (kg./cm.²) | 14 | 16 |
| Modulus at 200% (kg./cm.²) | 22 | 35 |
| Modulus at 300% (kg./cm.²) | 43 | 52 |
| Breaking load (kg./cm.²) | 205 | 212 |
| Elongation at break (percent) | 725 | 680 |
| Permanent set (percent) | 30 | 25 |

TABLE 2

| | | |
|---|---|---|
| Vulcanization time (minutes)[1] | 40 | 60 |
| Modulus at 100% (kg./cm.²) | 15 | 16 |
| Modulus at 200% (kg./cm.²) | 27 | 33 |
| Modulus at 300% (kg./cm.²) | 47 | 58 |
| Breaking load (kg./cm.²) | 209 | 210 |
| Elongation at break (percent) | 715 | 650 |
| Permanent set (percent) | 29 | 29 |

[1] Butyl rubber Enjay B 218 with a viscosimetric molecular weight equal to about 450,000 and unsaturation contents corresponding to 2.15% of the isoprene weight.

The results obtained showed that the polymer obtained in this experiment, conducted at a temperature between $-37$ and $-40°$ C. presents, after its vulcanization, properties that are very similar to those of commercial butyl rubber, which, as is well known, is produced at a temperature less than $-100°$ C.

Example 2

We obtained 12.35 g. of dry polymer (yield=44.5%) example, with the difference that we used as a co-catalyst a solution containing 0.2 m.moles of pivaloyl-chloride dissolved in 5 cm.³ of $CH_3Cl$.

The experiment was carried out at a temperature of $-40°$ C. and the addition of the co-catalyst was carried out over a period of seven minutes during which we had a temperature increase of 4° C.

We obtained 12.35 g. of dry polymer (yield =44.5%) which presents a $[\eta]$ equal to 1.45 dl./g. ($PM_v$=260,000), and an unsaturation content corresponding to 2.0% in isoprene weight.

The polymer was made to undergo vulcanization according to the means described in the previous example, and the properties of the vulcanized products so obtained were similar to those shown in Table 1.

Example 3

By the same means reported in Example 1, we introduced into the reactor the same quantities of solvent, monomers and AlEt$_2$Cl.

The reaction was started at the temperature of —40° C. through gradual introduction of a solution of 0.2 m.moles of acryloyl chloride in 5 cc. of CH$_3$Cl for a period of five minutes during which we had a temperature increase of 4° C. We obtained 10.15 g. of dry polymer (yield =35.8%) having [η]=1.78 dl./g. (PM$_v$=350,000) and isoprene contents equal to 2.65% in weight. The physical properties of the polymer were similar to those reported for Example 1.

Example 4

We repeated the experiment described in the previous example with the difference that we used as a co-catalyst a solution of trichloromethyl-sulphuryl-chloride (CCl$_3$SO$_2$Cl) (0.1 m.moles in 5 cc. of CH$_3$Cl). The addition was executed in a period of three minutes during which we had a temperature increase of 2° C. After another ten minutes of shaking we terminated the reaction and we obtained 4.15 g. of dry polymer (yield=14.6%).

The polymer has a [η]=2.26 dl./g. (PM$_v$=500,000) an unsaturation content corresponding to 2.5 in isoprene weight and it has physical characteristics similar to those of the sample in Example 1.

Example 5

With the same experimental technique previously described and using the same quantities of solvents and monomers and 2 moles of Al (isobutyl)$_2$Cl, we began the reaction with 0.2 m.moles of pivaloyl chloride, dissolved in 5 cc. of CH$_2$Cl. The addition was carried out slowly during a period of six minutes during which we noticed a temperature increase of 3° C. We continued the reaction for another ten minutes during which we obtained the formation of 12.28 g. of dry polymer (yield=43.2%) having an average viscosimetric molecular weight equal to 145,000 and an unsaturation content corresponding to 2.3% in isoprene weight.

Example 6

We used the same quantities of reagents as described in the previous example with the difference that we used as a catalyst 2 m.moles of AlEt$_2$Cl and as co-catalyst, 0.4 m.moles of 3.5 dinitro-benzoylchloride. The addition of the co-catalyst was carried out over a period of three minutes during which we noticed a temperature increase of 2° C. We obtained 8.12 g. of dry polymer (yield =28.6%) having [η]=1.50 dl./g. (PM$_v$=275,000) a content of unsaturations equal to 3.5% in isoprene weight and physical characteristics similar to the sample reported in Example 1.

Example 7

We repeated the experiment described in the previous example with the difference that we used as a catalyst 2 m.moles of AlEt$_2$Br and as a co-catalyst, 0.4 m.moles of 3.5 dinitro-benzoyl-chloride. We added the co-catalyst at the temperature of —35° C. over a period of four minutes during which we noticed a temperature increase of 3° C. We obtained 6.6 g. of dry polymer (yield=23.2%) having an average viscosimetric molecular weight equal to 178,000 and unsaturations contents equal to 3.9 in isoprene weight.

Example 8

Operating as described in the previous example, we used as a catalyst 2 m.moles of AlEt$_2$Cl, as co-catalyst, 0.6 m.moles of 2.4 of chloride-benzoylchloride. We carried out the addition at the temperature of —40° C. for a period of two minutes during which we noticed an increase of temperature of 2° C. We obtained 3.5 g. of dry polymer (yield=12.2%) having an average viscosimetric molecular weight equal to 255,000 and unsaturations contents equal to 3.2% in isoprene weight.

Example 9

Operating under the same conditions and with the same quantity of solvents and monomers reported in Example 1, we used as a catalyst 2 m.moles of AlEt$_2$Cl and as a co-catalyst 0.1 m.moles of oxalyl chloride dissolved in 5 cm.$^3$ of CH$_3$Cl operating at a temperature of —35° C.

The addition was effected gradually for a period of seven minutes during which we noticed an increase in temperature of 5° C. At the end of the reaction we obtained 18.6 g. of dry polymer (yield=65.5%) having an [η] equal to 1.52 dl./g. (PM$_v$=280,000) and a content of unsaturations equal to 2.7% in isoprene weight.

The properties of the polymer obtained after vulcanization resulted very similar to those reported for the sample in Example 1.

What is claimed is:

1. Process for the production of butyl rubber through the copolymerization of isobutylene and isoprene wherein the improvement comprises conducting the copolymerization in the presence of a catalytic system consisting essentially of:

(a) a metalorganic compound of aluminum represented by the formula AlR$_3$ or AlR$_2$X wherein X is a halogen atom; R is a hydrocarbon radical with from 1 to 10 carbon atoms or hydrogen; and (b) a haloid of an organic acid or thioacid represented by the general formula

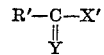

in which X' is a halogen atom; R' is an alkylic residue, cycloalkylic, alkylarylic, alkylcycloalkylic, or is equal to X' or is represented by the formula

and Y is oxygen or sulphur.

2. Process according to claim 1 wherein the molar ratio between the total quantity of the compound (b) and the compound (a) is less than 1.

3. Process according to claim 1, wherein the polymerization reaction is effected in the presence of a reaction medium selected from the aliphatic hydrocarbons, aromatics, cycloaliphatics and mono- or poly-halogenated hydrocarbons.

4. Process according to claim 3, wherein the reaction medium is methyl chloride.

5. Process according to claim 1, wherein the reaction of polymerization is conducted at a temperature in the range from —100° to +30° C.

6. Process according to claim 1, wherein the isobutylene and the isoprene are fed in quantities ranging from 90 to 99.5% of isobutylene by weight and from 10 to 0.5% of isoprene by weight.

References Cited
UNITED STATES PATENTS

| | | | |
|---|---|---|---|
| 3,753,959 | 8/1973 | Ichikawa et al. | 260—85.3 R |
| 3,380,981 | 4/1968 | Miller et al. | 260—85.3 R |
| 2,581,154 | 1/1952 | Walsh, Jr. et al. | 260—85.3 R |
| 2,931,791 | 4/1960 | Ernst et al. | 260—85.3 R |
| 3,560,458 | 2/1971 | Kennedy et al. | 260—85.3 R |
| 3,694,377 | 9/1972 | Kennedy et al. | 260—85.3 R |

JOSEPH L. SCHOFER, Primary Examiner

A. HOLLER, Assistant Examiner

U.S. Cl. X.R.

260—79.5 C, 85.3 C, 94.8

UNITED STATES PATENT OFFICE
CERTIFICATE OF CORRECTION

PATENT NO. : 3,850,894
DATED : November 26, 1974
INVENTOR(S) : Aldo Priola, et al It is certified that error appears in the above-identified patent and that said Letters Patent are hereby corrected as shown below:

Column 1, line 30, change "alkyl" to -- alkylic --.

Column 4, line 31, change "include" to -- included --, line 60, delete the entire sentence and substitute the following paragraph:

--We repeated the experiment described in the previous example, with the difference that we used as a co-catalyst a solution containing 0.2 m.moles of pivaloyl-chloride dissolved in $5 cm^3$ of $CH_3Cl$.--.

Signed and Sealed this twenty-second Day of July 1975

[SEAL]

Attest:

RUTH C. MASON
Attesting Officer

C. MARSHALL DANN
Commissioner of Patents and Trademarks